3,440,064
FIRE-RETARDANT SULPHUR COMPOSITIONS

Allen C. Ludwig, San Antonio, Tex., assignor, by mesne assignments, to Research Corporation, New York, N.Y., a non-profit corporation of New York
No Drawing. Filed Apr. 4, 1966, Ser. No. 539,724
Int. Cl. C09k 3/28; C09d 5/18; B27k 3/52
U.S. Cl. 106—15     8 Claims

ABSTRACT OF THE DISCLOSURE

There is provided a fire retardant sulphur composition containing sulphur and from 1 to 15 parts by weight per hundred parts of sulphur of styrene and/or alkene mercaptans and from 1 to 15 parts by weight per hundred parts of sulphur of a substantially non-vaporizing organic compound which together with the styrene and/or alkene mercaptan gives a non-burning or self-extinguishing composition. The organic compound may be maleic acid, fumaric acid, phthalic anhydride and the esters thereof; cyclic hydrocarbons; halogenated aromatics, phosphates and chlorinated paraffins among other compounds.

---

The present invention is concerned with the fire retarding of sulphur and sulphur-containing compositions.

It is well known that elemental sulphur will burn readily upon ignition. As a result, sulphur cannot generally be used where there is any real likelihood of fire, e.g., in building construction.

The principal object of the invention is to render sulphur fire retardant so that it will be non-burnable or self-extinguishing after contact with a flame. Another object of the invention is to provide fire retardant sulphur compositions which, because of their non-burning or self-extinguishing characteristics, are capable of uses where it has not previously been possible to effectively and safely use sulphur. Other objects will also be hereinafter apparent.

The desired objects are realized by incorporating into the sulphur an effective amount of (1) styrene monomer and/or dipentene dimercaptan or like alkene mercaptan, and (2) one or more other organic compounds, aliphatic or cyclic, which preferably do not substantially vaporize at ambient conditions and function in a fire-retarding manner when used in combinations with component (1).

The manner in which componnts 1 and 2 function to render the sulphur fire retardant is not understood. However, it appears that these components cooperate synergistically in some unique way to produce the desired fire retardant effect. This effect is unexpected as evidenced by the fact that some of the components which can be effectively used with the styrene and/or mercaptan, do not demonstrate any significant fire retarding properties by themselves and, on the contrary, may even be flammable. Significantly, conventional inorganic fire retardants or extinguishers such as antimony oxide, sodium phosphate or bicarbonate; boric acid or its derivatives; ammonium chloride, ammonium phosphate, ammonium sulphate; magnesium chloride, magnesium sulphate and zinc chloride, are not effective for present purposes and the unexpected nature of the invention is even further pointed up by the fact that certain compounds which would normally be considered structurally similar to components 2 do not function effectively.

It is essential to the success of the invention that styrene and/or the alkene mercaptan constitute one of the additives used herein. This additive is referred to herein for convenience as component 1. The other component should be one which, when used with component 1, gives a sulphur composition that is non-burning or self-extinguishable when subjected to the well known ASTM–D–635–56–T test. This test involves igniting a 5" x ½" x ⅛" bar of the composition being tested, the bar being held in a horizontal position ⅜" above a 20-mesh wire gauge. For a material to be rated non-burning by this test, the material must extinguish itself before the flame progresses one inch along the specimen after two thirty-second exposures to a one inch flame of a Bunsen burner. To be rated as self-extinguishing, the specimen must extinguish itself before the flame progresses four inches along the specimen. All of the compositions prepared according to the present invention qualify either as non-burning or self-extinguishing under this test. Such compositions are considered fire-retardant for present purposes.

Compounds found effective for use herein as component 2 may be selected from a variety of classes including dicarboxylic acids and their esters, such as maleic acid and fumaric acid and their esters, typically the alkyl maleates and alkyl fumarates; phthalic anhydride and its esters such as the alkyl esters; cyclic hydrocarbons; vinyl monomers of the formula

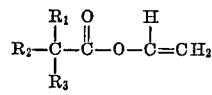

wherein $R_1$, $R_2$ and $R_3$ are alkyl, e.g., methyl, ethyl, propyl, etc., including longer chain alkyls such as octyl, nonyl and decyl; haloaromatics such as halostyrenes and halobenzenes; aryl and alkyl phosphates; and chlorinated paraffins.

Certain of the compounds in the above noted classes can be used with styrene and/or the mercaptan to give non-burning sulphur compositions while others give self-extinguishing products according to the ASTM–D–635–56–T test. Without intending to be limited thereby, the following compounds may be mentioned as suitable for use herein as component 2 to give non-burning compositions according to the invention; maleic acid, dioctyl maleate, monobutyl maleate, di-butyl fumarate, diisodecyl phthalate, di-n-butyl phthalate, VV–10 vinyl monomer (vinyl ester of versatic 10 acid—Shell Chemical Company), β-bromo-styrene, triphenyl phosphate, tricresyl phosphate and a chlorinated paraffin such as Chlorowax 70S (Diamond Alkali).

As specific examples of compounds found useful herein as component 2, to provide self-extinguishing compositions, there may be mentioned: dibutyl maleate, diisooctyl maleate, fumaric acid, phthalic anhydride, toluene, xylene, tributyl phosphate, p-dichlorobenzene, α,α,α - trichlorotoluene and halogenated naphthyl or phenyl compounds such as Halowax 1000 and Arochlor 1221. Other similar compounds may also be used in lieu of, or in addition to, those mentioned above to provide fire retardant sulphur compositions according to the invention.

The amount of component 2 can be varied but optimum proportions can be readily determined for specific situations using the ASTM test referred to above. Usually, however, at least one part of component 2, and possibly 3–15 or even somewhat higher, will be used for effective results based on 100 parts by weight of sulphur. In any event, the sulphur will always make up the major proportion (usually 75% or better) of the combined weight of sulphur and fire retardant additives.

The amount of styrene and/or alkene mercaptan used herein may also be varied depending on the nature and amount of component 2. Usually, however, the amount of component 1 will be in the range of 1–15 parts per 100 parts of sulphur.

The compositions of the invention may be prepared in any convenient manner which insures uniform mixing of components 1 and 2 with the sulphur. For example, the additives may be combined with elemental sulphur in particulate form and the resulting mixture heated above the melting point of the sulphur. As an alternative, the sulphur may be melted (usually by heating to a temperature in the range of 120–160° C. or even higher) followed by adding the fire retarding components separately or together to the molten sulphur. The preparation may be carried out at atmospheric pressure or elevated pressure as may be desired depending on the additives. When using styrene, it is usually preferred to use a closed mixing vessel whereas with the mercaptan, an open mixing vessel is adequate.

If desired, auxiliary materials may be added to the present compositions in order to obtain other desired properties. For example, one or more plasticizers may be added and, in some instances, these may serve to further improve the fire retardant properties of the composition. A preferred plasticizer for use herein is that available as LP–3 (i.e., an aliphatic polysulphide containing ether linkages and make up of the recurring unit —$S_xCH_2CH_2OCH_2CH_2S_x$— where $x$ has a value of 4). Glass fibers and/or other fillers such as mineral aggregates, may also be included in lieu of, or in addition to, the plasticizer.

The invention is illustrated, but not limited, by the following examples wherein parts are by weight:

Example 1

A composition was prepared by melting 100 parts sulphur at 140° C. in a closed vessel followed by mixing in 3 parts styrene and 3 parts maleic acid. The molten composition was poured into specimen molds and solidified to provide two test specimens both 5″ long, ½″ wide and ⅛″ thick. Both specimens were subjected to the ASTM D–635–56–T test referred to above. Each specimen was contacted twice (thirty seconds each time) with a one inch flame from a Bunsen burner. Immediately after removal of the flame, the specimens were examined for burning. Molten sulphur dropping on the gauze and also falling through the gauze onto the table top beneath the gauze was also examined for burning. Neither specimen burned when the flame was removed. There also was no burning of the molten sulphur on the gauze or table top below the gauze. In contrast, a corresponding specimen comprising unmodified elemental sulphur continued to burn after removal of the flame following the first thirty second ignition.

Example 1 was repeated with the following compositions and in each case, the composition was non-burning.

Example 2

| | Parts by weight |
|---|---|
| Sulphur | 100 |
| Styrene | 3 |
| Di-n-butyl phthalate | 3 |

Example 3

| | |
|---|---|
| Sulphur | 100 |
| Styrene | 3 |
| VV–10 vinyl monomer* | 3 |

*Identified as

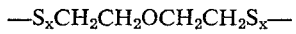

where $R_1$, $R_2$ and $R_3$ are alkyl.

Example 4

| | |
|---|---|
| Sulphur | 100 |
| Styrene | 10 |
| p-Dichlorobenzene | 10 |

Example 5

| | |
|---|---|
| Sulphur | 100 |
| Styrene | 3 |
| Di-isodecyl phthalate | 3 |

Example 6

| | Parts by weight |
|---|---|
| Sulphur | 100 |
| Styrene | 3 |
| Dibutyl fumarate | 3 |

Example 7

| | |
|---|---|
| Sulphur | 100 |
| Styrene | 3 |
| Monobutyl maleate | 3 |

Example 8

| | |
|---|---|
| Sulphur | 100 |
| Styrene | 3 |
| Dioctyl maleate | 3 |

Example 9

| | |
|---|---|
| Sulphur | 100 |
| Styrene | 3 |
| Chlorowax 70S | 3 |

Example 10

| | |
|---|---|
| Sulphur | 100 |
| Styrene | 3 |
| β-Bromostyrene | 3 |

Example 11

| | |
|---|---|
| Sulphur | 100 |
| Styrene | 3 |
| Chlorowax 70S | 3 |
| LP–3 | 3 |

Example 12

| | |
|---|---|
| Sulphur | 100 |
| Styrene | 3 |
| Tricesyl phosphate | 3 |

Example 13

| | |
|---|---|
| Sulphur | 100 |
| Styrene | 3 |
| p-Dichlorobenzene | 3 |
| LP–3 | 3 |

Example 14

| | |
|---|---|
| Sulphur | 100 |
| Styrene | 10 |
| Diiso decyl phthalate | 10 |

Example 15

| | |
|---|---|
| Sulphur | 100 |
| Styrene | 3 |
| Triphenyl phosphate | 3 |

Example 16

| | |
|---|---|
| Sulphur | 100 |
| Styrene | 15 |
| Dioctyl maleate | 3 |

Example 17

The following were prepared according to Example 1 to provide self-extinguishing compositions:

Formula A

| | Parts by weight |
|---|---|
| Sulphur | 100 |
| Styrene | 3 |
| Diiso octyl maleate | 3 |

Formula B

| | |
|---|---|
| Sulphur | 100 |
| Styrene | 1 |
| Diiso decyl phthalate | 1 |

Formula C

| | |
|---|---|
| Sulphur | 100 |
| Styrene | 4 |
| p-Dichlorobenzene | 2 |

The following non-burning compositions were prepared as in Example 1 except that dipentene dimercaptan (also known as 2,9-para menthane dithiol) was used instead of styrene and the components were mixed in an open vessel rather than in a closed vessel.

Example 18

| | Parts by weight |
|---|---|
| Sulphur | 100 |
| Dipentene dimercaptan | 3 |
| Dioctyl maleate | 3 |

Example 19

| | |
|---|---|
| Sulphur | 100 |
| Dipentene dimercaptan | 3 |
| Tricesyl phosphate | 3 |

Example 20

| | |
|---|---|
| Sulphur | 100 |
| Dipentene dimercaptan | 3 |
| Diiso decyl phthalate | 3 |

Example 21

| | |
|---|---|
| Sulphur | 100 |
| Dipentene dimercaptan | 15 |
| Dioctyl maleate | 3 |

Example 22

| | |
|---|---|
| Sulphur | 100 |
| Dipentene dimercaptan | 4 |
| Dioctyl maleate | 2 |

Example 23

| | |
|---|---|
| Sulphur | 100 |
| Dipentene dimercaptan | 3 |
| Dioctyl maleate | 3 |
| LP-3 | 3 |

Example 24

| | |
|---|---|
| Sulphur | 100 |
| Dipentene dimercaptan | 3 |
| Chlorowax 70S | 3 |

Example 25

The composition of Example 24 was subjected to the ASTM E84-61 test (Underwriters' Laboratories Standard 723). The composition was painted on ¼" asbestos-cement board for test purposes. A flame spread value of 12.5 was obtained. This value is well below the upper limit of 25 generally recognized for non-combustible materials under established building codes.

It will be appreciated from the foregoing that the compositions of the invention may be used wherever a fire-retardant form of sulphur is desired. One particularly advantageous use is in building construction where sulphur is used as the means for bonding building blocks or units together as described and claimed in U.S. application Ser. No. 248,902 filed Jan. 2, 1963, now U.S. Patent 3,306,-000 assigned to the present assignee. Other uses include fire retarded sulphur aggregates, sulphur foams, highway marking compositions or coating materials.

Various modifications may be made in the invention described herein. Hence the scope thereof is set forth in the following claims.

I claim:

1. A fire retardant sulphur composition containing sulphur, from 1 to 15 parts by weight per 100 parts of sulphur of at least one member of the group consisting of styrene and alkene mercaptans and from 1 to 15 parts by weight per hundred parts of sulphur of an organic compound which does not substantially vaporize at ambient conditions and, when used in conjunction with said styrene and/or alkene mercaptan, gives a non-burning or self-extinguishing composition using the ASTM-D-635-56-T test and selected from the group consisting of maleic acid and its alkyl esters; fumaric acid and its alkyl esters; phthalic anhydride and its alkyl esters; toluene; xylene; vinyl monomers of the formula

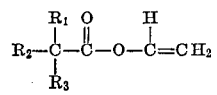

wherein $R_1$, $R_2$ and $R_3$ are alkyl of up to 10 carbon atoms; halostyrene; halobenzene; halotoluene; halonaphthyl and halophenyl; triphenyl, tributyl and tricresyl phosphates; and chlorinated paraffins.

2. The composition of claim 1 wherein said mercaptan is dipentene dimercaptan.

3. The composition of claim 1 comprising sulphur, styrene and, as the organic compound, at lesat one member of the group consisting of maleic acid, dioctyl maleate, monobutyl maleate, dibutyl fumarate, di-isodecyl phthalate, di-n-butyl phthalate, vinyl ester of versatic acid, β-bromostyrene, triphenyl phosphate, tricresyl phosphate and chlorinated paraffin.

4. The composition of claim 1 comprising sulphur, dipentene dimercaptan and, as the organic compound, at least one member of the group consisting of maleic acid, dioctyl maleate, monobutyl maleate, dibutyl fumarate, di-isodecyl phthalate, di-n-butyl phthalate, vinyl ester of versatic acid, β-bromo-styrene, triphenyl phosphate, tricresyl phosphate and chlorinated paraffin.

5. The composition of claim 1 comprising sulphur, styrene and, as the organic compound, at least one member of the group consisting of dibutyl maleate, diisooctyl maleate, fumaric acid, phthalic anhydride, toluene, xylene, tributyl phosphate, p-dichlorobenzene, $\alpha,\alpha,\alpha$,trichlorotoluene, and chlorinated phenyl and naphthyl compounds.

6. The composition of claim 1 comprising sulphur, dipentene dimercaptan and, as the organic compound, at least one member of the group consisting of dibutyl maleate, diisooctyl maleate, fumaric acid, phthalic anhydride, toluene, xylene, tributyl phosphate, p-dichlorobenzene, $\alpha,\alpha,\alpha$,trichlorotoluene, and chlorinated phenyl and naphthyl compounds.

7. A fire retardant sulphur composition consisting essentially of 100 parts sulphur, 1-15 parts styrene and 1-15 parts of a chlorinated paraffin, the parts being by weight.

8. A fire retardant sulphur composition consisting essentially of 100 parts sulphur, 1-15 parts dipentene dimercaptan and 1-15 parts of a chlorinated paraffin, the parts being by weight.

References Cited

UNITED STATES PATENTS

| | | | |
|---|---|---|---|
| 1,853,818 | 4/1932 | Kobbe | 252—8.1 XR |
| 1,962,003 | 6/1934 | Darrin. | |
| 2,757,075 | 7/1956 | Haimsohn | 23—224 |
| 3,251,797 | 5/1966 | Pugh et al. | 260—30.8 |
| 3,337,355 | 8/1967 | Dale et al. | 23—224 XR |

JULIUS FROME, *Primary Examiner.*

L. HAYES, *Assistant Examiner.*

U.S. Cl. X.R.

106—287; 117—137; 252—8.1